United States Patent [19]

Wilbur

[11] 4,240,714
[45] Dec. 23, 1980

[54] EXTENDED LIFE ELECTROCHROMIC DISPLAY CELL

[75] Inventor: Clayton V. Wilbur, San Jose, Calif.

[73] Assignee: International Business Machines Corporation, Armonk, N.Y.

[21] Appl. No.: 7,055

[22] Filed: Jan. 29, 1979

[51] Int. Cl.³ ............................................. G02F 1/17
[52] U.S. Cl. ................................................... 350/357
[58] Field of Search ...................... 350/357, 356, 355; 29/570, 592 R

[56] References Cited

U.S. PATENT DOCUMENTS

| | | | |
|---|---|---|---|
| 3,451,741 | 6/1969 | Manos | 350/357 |
| 3,879,629 | 4/1975 | Durand | 313/220 |
| 3,922,645 | 11/1975 | Camp et al. | 250/236 |
| 4,036,551 | 7/1977 | Mori | 350/357 |

Primary Examiner—James W. Davie
Attorney, Agent, or Firm—Joseph G. Walsh

[57] ABSTRACT

The life of an electrochromic display cell is extended by providing it with a reservoir containing an electrochromic solution. The electrochromic display cell comprises a front electrode which is transparent, a back electrode in spaced relation to said front electrode, a display chamber containing an electrochromic solution positioned between said front and back electrodes and a reservoir containing said solution associated with said display chamber and adapted for the flow of said solution between said reservoir and said chamber.

5 Claims, 2 Drawing Figures

EXTENDED LIFE ELECTROCHROMIC DISPLAY CELL

DESCRIPTION

Technical Field

The present invention is concerned with an electrochromic display cell and more particularly with such a cell which contains a reservoir containing electrochromic solution.

It is an object of the present invention to provide an electrochromic display device with an increased lifetime. This object is achieved by supplying the device with a reservoir for the storage of electrochromic solution.

BACKGROUND ART

Electrochromic display cells are well known in the prior art. For example, U.S. Pat. No. 3,451,741 contains a very good description and discussion of such devices. In general, it may be said that an electrochromic display cell comprises an electrochromic solution positioned between two electrically conductive electrodes at least one of which is transparent. This electrochromic solution comprises an oxidant/reductant pair contained in a solvent along with a conductive salt.

U.S. Pat. No. 3,922,645 is concerned with a visual display device comprising a rotatable fiber optic shutter. That device contains a reservoir for a light absorbing fluid, but the device is not an electrochromic device, and the reservoir is not for electrochromic solution.

U.S. Pat. No. 4,036,551 shows an electrochromic display apparatus in which supply holes are driven through an electrode. The patent, however, does not show any reservoir.

DISCLOSURE OF THE INVENTION

It has now been found that the useful life of an electrochromic display cell may be prolonged and extended by supplying it with a reservoir for the electrochromic solution.

The present invention provides an electrochromic display cell comprising a transparent front electrode; a back electrode in spaced relation to said front electrode; a display chamber containing an electrochromic solution positioned between said front and said back electrodes; and a reservoir containing said electrochromic solution associated with said display chamber and adapted for the flow of said solution between said reservoir and said chamber.

Figure 1:
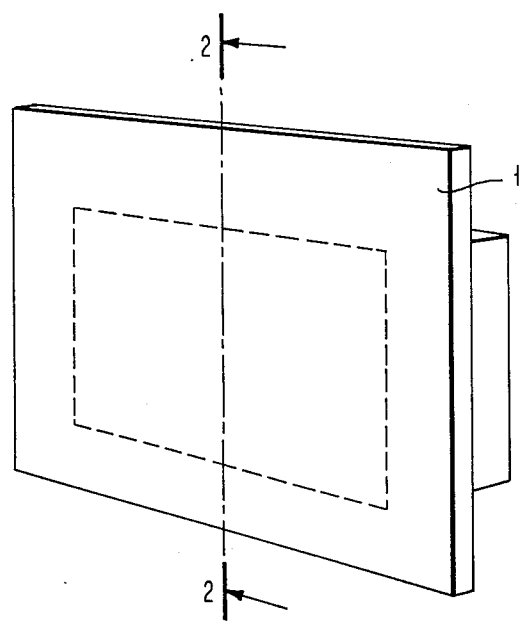
FIG. 1 is a perspective view of the electrochromic display cell according to the present invention. The FIGURE is not to scale.
Figure 2:
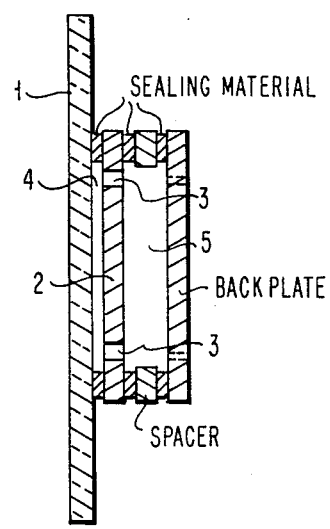
FIG. 2 (not to scale) is a section taken along line 2—2 of FIG. 1.

As is seen in FIG. 2, the display cell comprises a transparent front electrode 1 and a back electrode 2. In one preferred embodiment of the present invention, the back electrode 2 is provided with one or more holes 3. These holes provide for circulation between the display chamber 4 and the reservoir 5.

The use of the reservoir has been found experimentally to increase cell life. The explanation for this is not known with certainty, and the inventor does not wish to be bound by the following theory, which is offered merely as a possibility. The limited lifetime of electrochromic display cells is believed to be due to electrochromic degradation, which eventually causes the display to lose contrast. Usually this occurs by a buildup of color due to the electrochemically degraded material. This buildup is irreversible. After degradation buildup, a loss of the active ingredients occurs. Since the spacing between the electrodes is usually on the order of only 1 to about 3 mils, it has been very difficult to provide fresh solution to the cell. The present invention, by using a reservoir, greatly increases the volume of the cell. It also provides a recirculation path to ensure better utilization of the solution and to prevent localized buildup of the degraded material. In one preferred version of the present invention, there is direct communication between the reservoir and the display cell through one or more holes in the back electrode. Preferably, one hole is above and one hole below the electrode pattern on its surface.

Recirculation occurs by natural diffusion, but it can also be augmented, for example, by providing thermal differential in the display. In some cases the heat from the driven electrodes will be sufficient to provide this differential, but a separate heated electrode may be added when desired to improve circulation. With such heating the solution flows from the bottom of the display to the top. In this way, it draws fresh solution from the lower recirculation holes and moves the used solution into the reservoir through the top recirculation holes.

The present invention also has the additional advantage of being extremely simple to manufacture and of being capable of trouble-free usage for extremely long periods of time.

I claim:
1. An electrochromic display cell comprising:
   a transparent front electrode;
   a back electrode in spaced relation to said front electrode;
   means positioned between said front electrode and said back electrode defining a display chamber containing an electrochromic solution; and
   means associated with said display chamber providing a reservoir confining said electrochromic solution and means to permit the continuous flow of said solution between said reservoir and said chamber during usage.
2. A cell as claimed in claim 1 wherein said means to permit the continuous flow comprises openings in the back electrode.
3. A cell as claimed in claim 2 wherein at least one opening is near the top of the electrode and at least one opening is near the bottom of the electrode.
4. A cell as claimed in claim 1 including means for augmenting the rate of flow of said solution between said reservoir and said chamber.
5. A cell as claimed in claim 1 which includes means for applying heat to said reservoir to augment the rate of flow of said solution between said reservoir and said chamber.

* * * * *